US005354830A

United States Patent [19]
Williams

[11] Patent Number: 5,354,830
[45] Date of Patent: * Oct. 11, 1994

[54] VULCANIZABLE ONE-COMPONENT POLYSILOXANES

[75] Inventor: Thomas C. Williams, Ridgefield, Conn.

[73] Assignee: OSi Specialties, Inc., Danbury, Conn.

[*] Notice: The portion of the term of this patent subsequent to Nov. 10, 2009 has been disclaimed.

[21] Appl. No.: 81,614

[22] Filed: Jun. 23, 1993

Related U.S. Application Data

[60] Continuation-in-part of Ser. No. 923,457, Aug. 3, 1992, Pat. No. 5,275,980, which is a division of Ser. No. 627,578, Dec. 14, 1990, Pat. No. 5,162,480.

[51] Int. Cl.[5] ............................................. C08C 77/08
[52] U.S. Cl. ........................................ 528/15; 528/23; 528/31; 528/32; 556/462; 556/467; 556/469
[58] Field of Search ................. 528/23, 15, 31, 32; 556/462, 467, 469

[56] References Cited

U.S. PATENT DOCUMENTS

| Re. 32,107 | 7/1992 | January | 501/12 |
|---|---|---|---|
| 2,714,099 | 7/1955 | Weyenberg | 260/46.5 |
| 3,703,562 | 11/1972 | Antonen et al. | 260/825 |
| 3,843,702 | 10/1974 | de Montigny et al. | 260/448.2 |
| 4,222,952 | 9/1980 | Vick | 556/462 |
| 4,578,493 | 3/1986 | Chang | 556/451 |
| 4,581,391 | 4/1986 | Baldwin et al. | 523/179 |
| 4,634,610 | 1/1987 | Koehan et al. | 427/387 |
| 4,634,755 | 1/1987 | Hallgren et al. | 528/23 |
| 4,810,305 | 3/1989 | Braun et al. | 106/499 |
| 4,888,376 | 12/1989 | Atwell et al. | 524/401 |
| 4,981,820 | 1/1991 | Renlumd et al. | 501/39 |
| 5,081,199 | 1/1992 | Okinoshima | 528/15 |
| 5,130,400 | 7/1992 | Pachaly | 528/21 |
| 5,162,480 | 11/1992 | Schilling, Jr. et al. | 528/23 |

OTHER PUBLICATIONS

K. A. Andrianov, et al., Zhur. Obshch. Khim., 35, 103–106 (1965).
K. A. Andrianov, et al., Zhur. Obshch. Khim., 35, 524–527 (1965).
J. Organometal Chem., 4,440–445 (1965).

Primary Examiner—Melvyn I. Marquis
Attorney, Agent, or Firm—Andrew S. Reiskind

[57] ABSTRACT

Linear polysiloxanes containing alkylhydrosiloxane units, alkylvinylsiloxane units, and dialkylsiloxane units which polysiloxanes are siloxy-endblocked that are useful as vulcanizable one-component precursors for silicone elastomer compositions, a process for their preparation, a process for preparing vulcanized silicone elastomer compositions therefrom, and novel silicone elastomer compositions are described.

10 Claims, No Drawings

VULCANIZABLE ONE-COMPONENT POLYSILOXANES

This application is a continuation-in-part of now Patent No. 5,275,980, and U.S. Ser. No. 923,457, filed Aug. 3, 1992 now U.S. Pat. No. 5,275,980, which was a divisional of U.S. Ser. No. 627,578, filed Dec. 14, 1990, which issued as U.S. Pat. No. 5,162,480.

BACKGROUND OF THE INVENTION

1. Field of the Invention

This invention relates to linear polysiloxanes containing alkylhydrosiloxane units, alkylvinylsiloxane units, and dialkylsiloxane units, which polysiloxanes are siloxy-endblocked. These polysiloxanes are useful as vulcanizable one-component precursors for silicone elastomer compositions. This invention also relates to a process for the preparation of such polysiloxanes, to a process for the conversion of such polysiloxanes to vulcanized silicone elastomers, and to the vulcanizable silicone elastomer compositions so prepared.

2. Description of the Prior Art

Polysiloxanes containing methylhydrosiloxane and methylvinylsiloxane units have been prepared as by-products in the preparation of cyclic siloxanes by hydrolysis of chlorosilanes (K. A. Andrianov, et al., Zhur. Obshch. Khim., 35, 103 (1965); 35 524 (1965); and J. Organometal Chem., 4, 440 (1965)). The polysiloxanes of the above references containing these units were hydroxy-endblocked, i.e. terminated by hydroxyl groups, and water is formed when such siloxanes are cured. Moreover, these polysiloxanes did not contain dialkylsiloxane units in addition to the methylhydrosiloxane and methylvinylsiloxane units. Molecular weight control and reproducibility in preparing these polysiloxanes is difficult due to lack of specific siloxy-endblockers and to the large excess of hydroxy-endblocking reagent, i.e., water, used in such preparations.

U.S. Pat. No. 4,578,493 discloses branched polysiloxanes containing methylhydrosiloxane and methylvinylsiloxane units in combination with other units, including dimethylsiloxane units and trifunctional or tetrafunctional siloxane units, which polysiloxanes are silyl-endblocked to a random and undisclosed extent. Since these polysiloxanes are prepared by the cohydrolysis of Me$_3$SiCl, MeSiHCl$_2$, MeSiCl$_2$CH=CH$_2$, Me$_2$SiCl$_2$ and HSiCl$_3$, they are indiscriminately endblocked with Me$_3$Si-groups and by hydroxyl groups arising from the hydrolysis preparation.

It is also known that polysiloxanes containing methylhydrosiloxane units are usually equilibrated with an acid catalyst, while polysiloxanes containing methylvinylsiloxane units are usually equilibrated with a base catalyst (*The Chemistry and Technology of Silicones*, W. Noll, 2nd edition,, (Academic Press: 1968), p.219-229). Further, it does not appear that any single catalyst has been shown to be effective in preparing polysiloxanes containing units of both methylhydrosiloxane and methylvinylsiloxane by equilibration.

U.S. Pat. No. 3,843,702 discloses that trifluoromethanesulfonic acid (CF$_3$SO$_3$H), commonly referred to as triflic acid, can be a catalyst for the equilibration of lower molecular weight polysiloxanes containing neither silicon to hydrogen bonds nor silicon bonded to a vinyl group. U.S. Pat. Nos. 4,634,610 and 4,634,755 relate to the use of trifluoromethanesulfonic acid to make polysiloxanes having groups such as dimethylsiloxane and methylvinylsiloxane that do not contain silicon to hydrogen bonds. Nowhere do these references disclose an equilibration process for making a polysiloxane containing both silicon bonded to hydrogen and silicon bonded to a vinyl group.

U.S. Pat. No. 4,222,952 discloses that polysiloxanes containing silicon bonded to hydrogen can be rearranged, and, therefore, can be equilibrated, using solid perfluorinated polymers containing pendant sulfonic groups as equilibration catalysts.

U.S. Pat. No. 4,581,391 discloses that methylvinylsiloxane units in polysiloxanes increase the ablation resistance/insulation properties of diorganosiloxane polymers by forming ceramic residue or char on exposure to high temperature. In this reference, the polysiloxanes are cured by the addition of a second polysiloxane containing methylhydrosiloxane units in the presence of a crosslinking platinum catalyst.

U.S. Pat. No. 4,888,376 discloses a hydroxy-endblocked polysiloxane containing methylhydrosiloxane and methylvinylsiloxane units and a siloxy-endblocked polysiloxane having either methylhydrosiloxane units or methylvinylsiloxane units, but not both units in the same polysiloxane. The polysiloxanes of this reference are prepared by hydrolysis.

It is standard practice in the silicones industry to employ two-component vulcanizable systems for preparing silicone elastomers. Typically, one component contains methylvinylsiloxane units and the second component contains methylhydrosiloxane units, with vulcanization occurring through catalyzed addition of methydrosiloxane groups to methylvinylsiloxane groups. This practice continues even in recent patents, such as U.S. Pat. Nos. 4,645,815 and 4,709,001.

Accordingly, the prior art does not disclose linear siloxy-endblocked polysiloxanes containing units of alkylhydrosiloxane, alkylvinylsiloxane, and dialkoxysiloxane that are effective vulcanizable one-component precursors for silicone elastomer compositions. Additionally, the prior art does not disclose an equilibration process for preparing linear siloxy-endblocked polysiloxanes containing units of alkylhydrosiloxane, alkylvinylsiloxane, and dialkylsiloxane.

OBJECTIVES OF THE INVENTION

It is a primary object of the present invention to provide a linear polysiloxane having alkylhydrosiloxane units, alkylvinylsiloxane units, and dialkylsiloxane units which polysiloxanes are siloxy-endblocked.

It is an object of the present invention to provide linear polysiloxanes that are useful as vulcanizable one-component precursors for the preparation of silicone elastomer compositions.

Another object of the present invention is to provide a process for preparing a linear siloxy-endblocked polysiloxane having alkylhydrosiloxane units, alkylvinylsiloxane units, and dialkylsiloxane units by a process of equilibration.

A further object of the present invention is to provide a process that produces a high yield of such linear polysiloxanes and low levels of cyclic siloxanes so as to limit the need for removal of the cyclic siloxanes from the polysiloxane.

Other objects and advantages of the present invention will be made apparent by the description and examples which follow.

SUMMARY OF THE INVENTION

The present invention provides a polysiloxane having the formula:

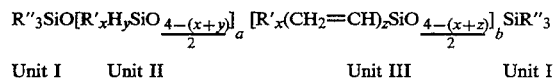

Unit I    Unit II              Unit III         Unit I wherein:
R' is an alkyl group having 1 to 4 carbon atoms;
R'' is hydrogen, a vinyl group or an alkyl group having 1 to 4 atoms;
x has a value of from 1 to 2;
y has a value from 0 to 1;
z has a value from 0 to 1;
with the proviso that x+y is 2, x+z is 2, y and z each has an average value of 0.005 to 0.74; and a and b each has an average value from 2 to 500.

The present invention also provides a process for the preparation of the above-described polysiloxane which comprises: (1) reacting in the presence of a sulfonic acid catalyst with agitation at ambient or higher temperature and pressure a reaction mixture of siloxanes containing Units I, II, and III which siloxanes are selected from at least one siloxane selected from (i) cyclic siloxanes selected from the group consisting of $(OSiR'H)_c$, $(OSiR'CH=CH_2)_c$, $(OSiR'_2)_d$, $(OSiR'H)_e(OSiR'CH=CH_2)_f$, $(OSiR'_2)_e(OSiR'H)_f$, and $(OSiR'_2)_e(OSiR'CH=CH_2)_f$ wherein c and d are each a positive integer ranging from 3 to 10; e and f are positive integers; and e+f equals c or d; and one or more siloxanes selected from group (ii) or group (iii);

wherein group (ii) consists of endblocking disiloxanes of the formula:

R''$_3$SiOSiR''$_3$ and wherein group (iii) consists of linear siloxanes selected from the group consisting of R''$_3$Si(OSiR'H)$_g$OSiR''$_3$, R''$_3$Si(OSiR'CH=CH$_2$)$_g$OSiR''$_3$, and R''$_3$Si(OSiR'$_2$)$_g$OSiR''$_3$ wherein g is a positive integer ranging from 1 to 100 and wherein in groups (i), (ii) and (iii), R' is an alkyl group having from 1 to 4 carbon atoms and R'' is hydrogen, an alkyl group having 1 to 4 carbon atoms, or vinyl group with the proviso that y and z each has an average value of 0.005 to 0.74;

(2) neutralizing the catalyst; and optionally
(3) vacuum stripping the polysiloxane.

The invention further provides a vulcanized silicone elastomer composition and a process for the conversion of the above-described polysiloxane to the silicone elastomer composition which process comprises vulcanization in the presence of a noble metal catalyst at a temperature ranging from about room temperature to 100° C.

DETAILED DESCRIPTION OF THE INVENTION

In the present invention a linear polysiloxane containing alkylhydrosiloxane, alkylvinylsiloxane, and dialkylsiloxane units in the same polymer, which linear polysiloxanes are siloxy-endblocked is disclosed. The linear polysiloxanes of the present invention are prepared by an equilibration process. Polysiloxanes of the present invention are represented by the formula:

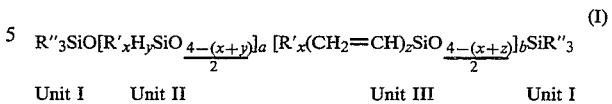

Unit I    Unit II              Unit III         Unit I

In the formula (I) above, R' is an alkyl group having 1 to 4 carbon atoms. Preferably, R' is a methyl group. R'' in the formula (I) above is hydrogen, a vinyl group, or an alkyl group having 1 to 4 atoms. Preferably, R'' is hydrogen, a vinyl group, or a methyl group. Most preferably, at least 75% of the R'' groups are methyl groups.

In formula (I), x, y, and z are integers. In formula (I), x has a value of 1 to 2; y has a value of 0 or 1; and z has a value of 0 to 1 with the proviso that x+y is 2, x+z is 2, y and z each has an average value of 0.005 to 0.74. Preferably, y is less than 0.5 and z is less than 0.5. Most preferably y and z are each less than 0.3.

Further, in formula (I) a and b each has an average value from 2 to 500. Preferably a+b is 4 to 800, most preferably a+b is 25 to 700. In formula (I), the ratio of a to b is about 0.5:1 to 1:0.5, preferably about 0.75:1 to 1:0.75, and most preferably about 1:1.

A preferred embodiment of the present invention is a polysiloxane composition according to formula (I) in which R' and R'' are methyl groups; y and z are each less than 0.3; a+b is 25 to 700; and the ratio of a to b is about 1:1.

Linear polysiloxanes of the present invention are prepared by an equilibration process that comprises reacting at least one cyclic siloxane (i) with an endblocking disiloxane (ii) and/or a linear siloxane (iii) in the presence of a catalyst. Such siloxanes are comprised of a major portion of respective Units II and III containing silicon-bonded methyl groups and a minor portion of respective Units II and III containing silicon-bonded hydrogen and silicon-bonded vinyl groups. All of the siloxanes used herein are commercially available and/or their preparation is known to those skilled in the art.

Suitable starting materials include:
(i) Cyclic siloxanes of the formulae:
$(OSiR'H)_c$, $(OSiR'CH=CH_2)_c$,
$(OSiR'_2)_d$,
$(OSiR'H)_e(OSiR'CH=CH_2)_f$,
$(OSiR'_2)_e(OSiR'H)_f$, and
$(OSiR'_2)_e(OSiR'CH=CH_2)_f$
wherein c and d are each positive integers ranging from 3 to 10 and e and f are positive integers and e+f equals c or d. Illustrative cyclic siloxanes include
$(OSi(CH_3)_2)_c$,
$(OSi(CH_3)_2)_e(OSi(CH_3)H)_f$,
$(OSi(CH_3)_2)_e(OSi(CH_3)CH=CH_2)_f$,
$(OSi(CH_3)H)_c$,
$(OSi(CH_3)CH=CH_2)_c$,
$(Si(CH_3)H)_e(OSi(CH_3)CH=CH_2)_f$, (ii) Endblocking disiloxanes of the formula:

R''$_3$SiOSiR''$_3$ wherein R'' is a hydrogen, a vinyl group, or an alkyl group having 1 to 4 atoms. Illustrative endblocking disiloxanes include
$((CH_3)_3Si)_2O$,
$(CH_2=CH(CH_3)_2Si)_2O$, and
$(H(CH_3)_2Si)_2O$.

(iii) Linear siloxanes of the formulae:

R"$_3$Si(OSiR'H)$_g$OSiR"$_3$,
R"$_3$Si(OSiR'CH=CH$_2$)$_g$OSiR"$_3$, and
R"$_3$Si(OSiR'$_2$)$_g$OSiR"$_3$ wherein g is a positive integer ranging from 1 to 100. Illustrative linear siloxanes suitable as starting materials in the process of the present invention include:

(CH$_3$)$_3$Si(OSi(CH$_3$)$_2$)$_g$OSi(CH$_3$)$_3$,
H(CH$_3$)$_2$Si(OSi(CH$_3$)$_2$)$_g$OSi(CH$_3$)$_2$H
(CH$_3$)$_3$Si(OSi(CH$_3$)H)$_g$OSi(CH$_3$)$_3$
H(CH$_3$)$_2$Si(OSi(CH$_3$)H)$_g$OSi(CH$_3$)$_2$H
(CH$_3$)$_3$Si(OSi(CH$_3$)CH=CH$_2$)$_g$OSi(CH$_3$)$_3$
H(CH$_3$)$_2$Si(OSi(CH$_3$)CH=CH$_2$)$_g$OSi(CH$_3$)$_2$H
CH$_2$=CHSi(CH$_3$)$_2$(OSi(CH$_3$)H)$_g$OSi(CH$_3$)$_2$CH=CH$_2$
CH$_2$=CHSi(CH$_3$)$_2$(OSi(CH$_3$)$_2$)$_g$OSi(CH$_3$)$_2$CH=CH$_2$
and
CH$_2$=CH(CH$_3$)$_2$Si(OSi(CH$_3$)CH=CH$_2$)$_g$OSi(CH$_3$)$_2$CH=CH$_2$.

For reasons of commercial availability, the siloxanes of groups (i) and (ii) are preferred starting materials. Optionally, linear siloxanes (iii) may be used as starting materials in the process of the present invention.

The siloxane starting materials selected from groups (i), (ii) and (iii) above are used in an equilibration process. The siloxane starting materials are reacted in the presence of a sulfonic acid catalyst at ambient or higher temperature and pressure.

Suitable catalysts for the equilibration process of preparation of the polysiloxanes of the present invention include trifluoromethanesulfonic acid (commonly referred to as "triflic acid") and related strong soluble acids. Other forms of such acids, including insoluble crosslinked forms such as Nafion ® have been used as equilibration catalysts and can be employed in the process of the present invention. Similarly, silyl esters of triflic acid, such as CF$_3$SO$_3$SiMe$_3$ can also be used since hydrolysis by incidental moisture or reaction with low levels of silanol groups will generate triflic acid. However, the preferred catalyst is trifluoromethanesulfonic acid (CF$_3$SO$_3$H).

In the process of the present invention, the catalyst is present in an amount ranging from about 0.02 to about 5 percent by weight, preferably 0.05 to about 0.5 percent by weight, based on the total (i) disiloxane, (ii) cyclic siloxane and/or (iii) linear siloxane used. Optionally, a solvent selected from the group consisting of acetonitrile, dimethylsulfoxide and hexamethylphosphoramide can be added to the catalyst. Preferably, the solvent is acetonitrile. When a solvent is employed it is added to the catalyst in an amount ranging from 1 to 20 times the weight of the catalyst in the reaction.

After the polysiloxane of the present invention is formed by the equilibration reaction described above, the catalyst is neutralized by the addition of from about 0.04 to 10 weight percent of an inorganic salt selected from the group consisting of sodium carbonate and sodium bicarbonate. After the catalyst is neutralized, the solid salts of the neutralized catalyst are removed by filtration, and the polysiloxane so formed may be concentrated by vacuum stripping. Another, and preferred means, of neutralizing the catalyst is by the addition of 0.04 to 10 weight percent of allyltrimethylsilane forming F$_3$CSO$_3$SiMe$_3$ and propylene which are removed by vacuum stripping. Yet another means for neutralizing the catalyst is by the addition of 0.04 to 10 weight percent of hexamethyldisilazane forming F$_3$CSO$_3$-SiMe$_3$ and ammonia which are removed by vacuum stripping.

In the process of the present invention the reaction and neutralization steps are not, narrowly critical and can be performed at ambient or higher temperatures and pressure in any equipment unreactive to the siloxane starting materials and catalyst. Further, the equipment can have any means for charging the individual reactants, for agitation, and for removal of the polysiloxane so produced by the process of the present invention. If desired the polysiloxanes of the present invention may be devolatilized to remove the low levels of undesired cyclic siloxanes that may be produced and these may be returned to a subsequent preparation.

Molecular weights of the linear polysiloxanes of the present invention are not narrowly critical and so the polysiloxanes may vary from low viscosity fluids to high viscosity fluids or semisolids. The desired viscosity or molecular weight range may depend upon the application of the siloxane elastomer composition made from the polysiloxane of the present invention. For example, if it is desired to impregnate a finely porous solid with a polysiloxane of the present invention prior to conversion to a silicone elastomer, then the polysiloxane should be a low viscosity fluid. If, however, it is desired to make an impregnated mat by surrounding a woven, fibrous structure prior to curing and conversion to a silicone elastomer, then the polysiloxane should be a high viscosity fluid or pourable semisolid. Those skilled in the art are familiar with the properties needed for various applications and can adapt the process of the present invention accordingly.

Conversion to Silicone Elastomer Compositions

The linear polysiloxanes of the present invention are convertible to silicone elastomer compositions by themselves or in mixtures with other well known components. Such components include, for example, inorganic fillers such as silicon carbide, silicon nitride, silica and other inorganic fillers known to those skilled in the art.

The linear polysiloxanes of the present invention are converted to silicone elastomer compositions by heating at an appropriate rate to an uncatalyzed curing temperature of 100° C. or beyond, but are preferably vulcanized at lower temperatures, including room temperature, through the action of a noble metal catalyst. Free radical initiators, including peroxides and azo compounds may also be used, but noble metal catalysts are preferred. Most preferred are compounds of platinum, with a particularly preferred embodiment being a soluble platinum compound disclosed in U.S. Pat. No. 3,419,593, which is commercially available. Other platinum compounds, including those which are inhibited to allow catalysis only above room temperature are well known to those skilled in the art and may also be used to catalyze the vulcanization of the linear polysiloxanes of the present invention.

Whereas the exact scope of the present invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

In the examples, all reactions took place in standard laboratory glassware, using heating mantles, mechanical or magnetic stirrers, thermometers and condensers. A nitrogen atmosphere was maintained. The abbreviations g, mm, ml, min, hr, and Me represent gram, millimeter, milliliter, minute, hour, and methyl ($CH_3$), respectively. Temperatures were recorded in centigrade degrees.

EXAMPLE 1

Preparation of
$HMe_2Si(OSiMeH)_{9.6}(OSiMeCH=CH_2)_8OSiMe_2H$

In a 250 ml three-necked flask fitted with thermometer, mechanical stirrer, and water condenser were combined 10.1 g (0.075 mol) of 1,1,3,3-tetramethyldisiloxane, $(HSiMe_2)_2O$, 44.5 g (0.185 mol) of 1,3,5,7-tetramethylcyclotetrasiloxane, $(OSiMeH)_4$, and 51.7 g (0.15 mol) of 1,3,5,7 tetramethyl-1,3,5,7-tetravinylcyclotetrasiloxane, $(OSi-MeCH-CH_2)_4$. A solution of $CF_3SO_3$ 1.06 g total) was added and the mixture allowed to stir at room temperature for 72 hrs. Analysis by gas chromatography (GC) showed that equilibrium had been reached. The catalyst was neutralized with a solution of allyltrimethylsilane (10% active in petroleum ether, 1.2 g total), and the product vacuum-stripped to 40°/2 mm. Analyses by nuclear magnetic resonance (NMR) and gel permeation chromatography (GPC) confirmed the product structure.

EXAMPLE 2

Preparation of
$CH_2=CHMe_2Si(OSiMe_2)_{17.2}(OSiMeH)_{4.5}$
$(OSiMeCH=CH_2)_{3.2}OSiMe_2CH=CH_2$ The procedure of Example 1 was followed using 164.3 g (0.25 mol) of $CH_2=CHMe_2Si(OSiMe_2)_{6.37}OSiMe_2CH=CH_2$, 199.9 g (0.674 mol) of $(OSiMe_2)_4$, 67.6 g (0.28 mol) of $(OSiMeH)_4$, 68.9 g (0.20 mol) of $(OSiMeCH=CH_2)_4$, 2.5 g of 10% active $CF_3SO_3H$ in $CH_3CN$, and 2.85 g of 10% active allyltrimethylsilane in petroleum ether. The equilibration time was 64 hr. at room temperature, followed by neutralization. Vacuum stripping at 40°/2 mm removed 9.0 g of volatiles. Analyses by GC, NMR, and GPC confirmed the structure. This example illustrates that polysiloxanes, containing a significant amount of dimethylsiloxane units ($OSiMe_2$) can be produced by the process of the present invention.

EXAMPLE 3

Preparation of
$Me_3Si(OSiMeH)_8(OSiMeCH=CH_2)_8OSiMe_3$

The procedure of Example 1 was repeated using 68.94 g of commercially available cyclic methylvinylcyclosiloxanes, 50.53 g of $Me_3Si(OSiMeH)_{48}OSiMe_3$, and 13.8 g of $(Me_3Si)_2O$, with 0.67 g of triflic acid dissolved in 0.67 g of acetonitrile as the catalyst. After 18 hours, equilibrium was reached and the reaction was neutralized with 0.73 g of allyltrimethylsilane. Vacuum stripping to 50°/3.3 mm provided 128.8 g of product (96.6% of theoretical). NMR Analysis confirmed the structure. This example demonstrates the introduction of endblocking siloxy groups which do not contain vinylic or hydrido functionality.

EXAMPLE 4

Preparation of $HSiMe_2(OSiMe_2)_{663.6}(OSiMeH)_{2.2}$
$(OSiMeCH=CH_2)_{4.2}OSiMe_2H$ The procedure of Example 1 was followed with 164.1 g of octamethylcyclotetrasiloxane, 5.30 g of a 10% solution by weight of 1,3,5,7-tetramethylcyclotetrasiloxane in octamethylcyclotetrasiloxane, 14.52 g of a 10% solution by weight of 1,3,5,7-tetramethyl-1,3,5,7-tetravinylcyclotetrasiloxane in octamethylcyclotetrasiloxane, and 16.08 g of a 10% solution by weight of $HSiMe_2(OSiMe_2)_{3.6}$ $OSiMe_2H$ in octamethylcyclotetrasiloxane (200.0 g total of siloxanes), plus 1.0 g of a 10% solution by weight of $CF_3SO_3H$ in acetonitrile. The solution was stirred at room temperature under nitrogen for 72 hrs, followed by neutralization with 1.14 g of a 10% solution by weight of allyltrimethylsilane in petroleum ether and stirring for 1 hr. The resultant product was vacuum stripped at 40°/0.4 mm; analyses by GPC and $SiH/SiCH=CH_2$ contents confirmed the product structure.

EXAMPLE 5, 6, and 7

Preparations of $Me_3Si$ $(OSiMe_2)_{660}$ $(OSiMeH)_4$ $(OSiMeCH=CH_2)_4$ $OSiMe_3$ (Ex. 5); $HSiMe_2$ $(OSiMe_2)_{662}$ $(OSiMeH)_2$ $(OSiMeCH=CH_2)_4$ $OSiMe_2H$ (Ex. 6); and $CH_2=CHSiMe_2$ $(OSiMe_2)_{662}(OSiMeH)_4(OSiMeCH=CH_2)_2OSiMe_2$ $CH=CH_2$ (Ex. 7)

The procedure of Example 4 was repeated with appropriately adjusted 200.0 g mixtures of siloxanes. Hexamethyldisiloxane was used as the endblocker in Example 5, $HSiMe_2$ $(OSiMe_2)_{3.6}$ $OSiMe_2H$ was used as the endblocker in Example 6. And, $CH_2=CHSiMe_2$ $(OSiMe_2)_{6.4}OSiMe_2CH=CH_2$ was used as the endblocker in Example 7. The procedures and amounts of Example 4 were followed except that the solutions were allowed to stir for 120 hrs. before neutralization. Analyses by GPC and $SiH/SiCH=CH_2$ contents confirmed the respective product structures.

EXAMPLE 8

Preparation of a Vulcanized Silicone Elastomer

Two 10 g portions of the product of Example 4 were mixed with 1.0 g samples of solutions of a platinum-divinyltetramethyldisiloxane complex (3% by weight of Pt in complex) in petroleum ether at respective concentrations of 1.0% and 10.0% by weight of complex. The portion treated with the 1.0 wt-% Pt complex solution thickened, but did not cure after standing 6 hrs at room temperature. The second, treated with the 10.0 wt-% Pt complex solution, cured in 6 hrs at room temperature to a transparent, non-tacky elastomer. This example shows that a silicone elastomer can be prepared from a one-component precursor wherein the one component contains both hydroalkylsiloxane groups and vinylalkylsiloxane groups.

What is claimed is:

1. A polysiloxane having the formula:

$$R''_3SiO[R'_xH_ySiO_{\frac{4-(x+y)}{2}}]_a[R'_x(CH_2=CH)_zSiO_{\frac{4-(x+z)}{2}}]_bSiR''_3$$

wherein:
R' is an alkyl group having 1 to 4 carbon atoms;

R″ is hydrogen, a vinyl group or an alkyl group having 1 to 4 atoms;

x has a value of from 1 to 2;

y has a value of from 0 to 1;

z has a value of from 0 or 1;

with the proviso that x+y is 2, x+z is 2, y and z each has an average value of 0.005 to 0.74; and a and b each has an average value from 2 to 500.

2. A polysiloxane according to claim 1, wherein R′ and R″ are methyl, y and z are each less than 0.1, a+b is about 50 to 700, and the ratio of a to b is about 1:1.

3. A polysiloxane according to claim 2, wherein one R″ is a hydrogen or a vinyl group in each endblocking unit.

4. A process for the preparation of a polysiloxane having the formula:

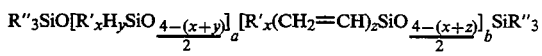

wherein:

R′ is an alkyl group having 1 to 4 carbon atoms;

R″ is hydrogen, a vinyl group or an alkyl group having 1 to 4 atoms;

x has a value of from 1 to 2;

y has a value of from 0 to 1;

z has a value of from 0 or 1;

with the proviso that x+y must equal 2, x+z must equal 2, y and z each has an average value of 0.005 to 0.74; and a and b each has an average value from 2 to 500, which process comprises (1) reacting in the presence of a sulfonic acid catalyst with agitation at ambient or higher temperature and pressure at least one siloxane selected from (i) cyclic siloxanes selected from the group consisting of (OSiR′H)$_c$, (OSiR′CH=CH$_2$)$_c$, (OSiR′$_2$)$_d$, (OSiR′H)$_e$(OSiR′CH=CH$_2$)$_f$, (OSiR′$_2$)$_e$(OSiR′H)$_f$, and (OSiR′$_2$)$_e$(OSiR′CH=CH$_2$)$_f$ wherein c and d are positive integers ranging from 3 to 10 and e and f are positive integers and e+f equals c or d; with at least one siloxane selected from group (ii) or group (iii); wherein group (ii) consists of endblocking disiloxanes of the formula:

R″$_3$SiOSiR″$_3$ and wherein group (iii) consists of linear siloxanes selected from the group consisting of R″$_3$Si(OSiR′H)$_g$OSiR″$_3$, R″$_3$Si(OSiR′CH=CH$_2$)$_g$OSiR″$_3$, and R″$_3$Si(OSiR′$_2$)$_g$OSiR″$_3$ wherein g is a positive integer ranging from 1 to 100 and wherein in groups (i), (ii) and (iii), R′ is an alkyl group having from 1 to 4 carbon atoms and R″ is hydrogen, an alkyl group having 1 to 4 carbon atoms, or vinyl group;

(2) neutralizing the catalyst; and (3) vacuum stripping the polysiloxane.

5. A process according to claim 4, wherein the sulfonic acid catalyst is trifluoromethanesulfonic acid present in an amount ranging from 0.02 to 2.0 percent by weight based on the total weight of (i), (ii), and (iii), the endblocking disiloxane is selected from the group consisting of ((CH$_3$)$_3$Si)$_2$O, (CH$_2$=CH(CH$_3$)$_2$Si)$_2$O, and (H(CH$_3$)$_2$Si)$_2$O; the cyclic siloxanes are selected from the group of (OSi(CH$_3$)$_2$)d, (OSi(CH$_3$)H)$_c$, (OSi(CH$_3$)CH=CH$_2$)$_c$, (OSi(CH$_3$)-H)$_e$(OSi(CH$_3$)CH=CH$_2$)$_f$, (OSi(CH$_3$)$_2$)$_e$(OSi(CH$_3$)H)$_f$, and (OSi(CH$_3$)$_2$)$_e$(OSi(CH$_3$)CH=CH$_2$)$_f$; wherein c and d are positive integers ranging from 3 to 10; e and f are positive integers; e+f equals c or d; and the linear siloxanes are selected from the group of (CH$_3$)$_3$Si(OSi(CH$_3$)H)$_g$OSi(CH$_3$)$_3$, H(CH$_3$)$_2$Si(OSi(CH$_3$)H)$_g$OSi(CH$_3$)$_2$H, (CH$_3$)$_3$Si(OSi(CH$_3$)CH=CH$_2$)$_g$OSi(CH$_3$)$_3$, H(CH$_3$)$_2$Si(OSi(CH$_3$)CH=CH$_2$)$_g$OSi(CH$_3$)$_2$H, CH$_2$=CHSi(CH$_3$)$_2$(OSi(CH$_3$)H)$_g$OSi(CH$_3$)$_2$CH=CH$_2$, CH$_2$=CHSi(CH$_3$)$_2$(OSi(CH$_3$)CH=CH$_2$)$_g$OSi(CH$_3$)$_2$CH=CH$_2$, (CH$_3$)$_3$Si(OSi(CH$_3$)$_2$)$_g$OSi(CH$_3$)$_3$, H(CH$_3$)$_2$Si(OSi(CH$_3$)$_2$)$_g$Si(CH$_3$)$_2$H, and CH$_2$=CHSi(CH$_3$)$_2$(OSi(CH$_3$)$_2$)$_g$OSi(CH$_3$)$_2$CH=CH$_2$, wherein g is a positive integer of 1 to 100.

6. A process according to claim 5, wherein from about 0.5 to 10 times the equivalent weight of a solvent selected from the group consisting of acetonitrile, dimethylsulfoxide, and hexamethylphosphoramide is added to the catalyst before the reaction; the catalyst is neutralized after the reaction with 0.04 to 10 percent by weight based on the total weight of (i), (ii), and (iii) of a neutralizing agent selected from the group consisting of sodium carbonate, sodium bicarbonate, allyltrimethylsilane, or hexamethyldisilazane; and the reaction mixture is vacuum stripped.

7. A process for the conversion of a polysiloxane having the formula:

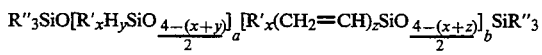

wherein:

R′ is an alkyl group having 1 to 4 carbon atoms;

R″ is hydrogen, a vinyl group or an alkyl group having 1 to 4 atoms;

x has a value of from 1 to 2;

y has a value of from 0 to 1;

z has a value of from 0 or 1;

with the proviso that x+y must equal 2, x+z must equal 2, y and z each has an average value of 0.005 to 0.74; and a and b each has an average value from 2 to 500 to a silicone elastomer composition which comprises:

mixing the polysiloxane with an effective amount of a noble metal catalyst at a temperature ranging from about room temperature to 100° C.

8. A process according to claim 7, wherein R′ and R″ are methyl; y and z are each less than 0.1; a +b is about 50 to 700; the ratio of a to b is about 1:1; and the noble metal catalyst is a platinum compound.

9. A process according to claim 7, wherein one R″ is hydrogen or a vinyl group in each endblocking unit.

10. A silicone elastomer composition prepared in accordance with the process of claim 7.

* * * * *